May 29, 1956  R. L. KUSS  2,748,047
REINFORCED WALLS OF HOLES IN PLASTIC
MEMBERS AND METHOD OF MAKING SAME
Filed Sept. 29, 1954  2 Sheets-Sheet 1
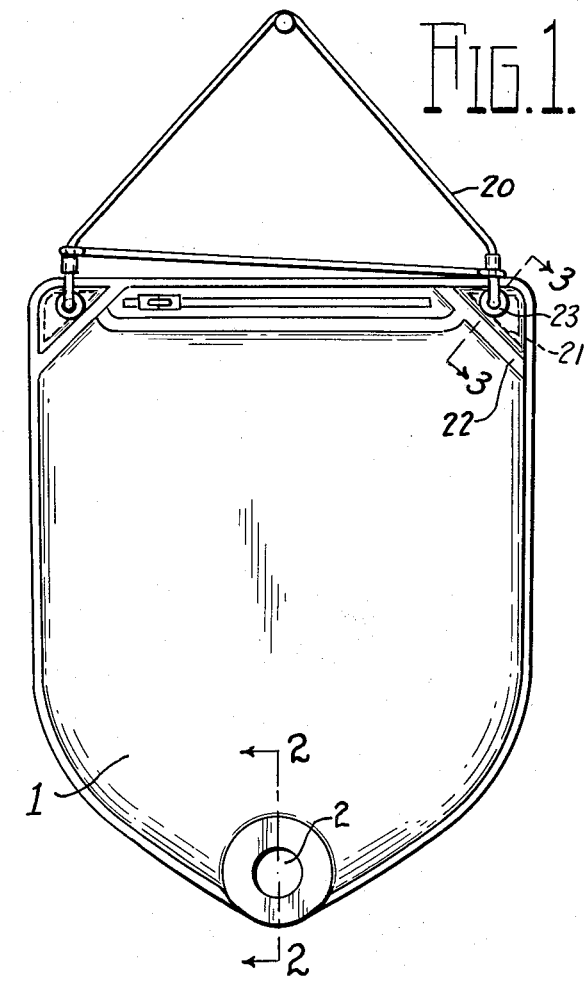
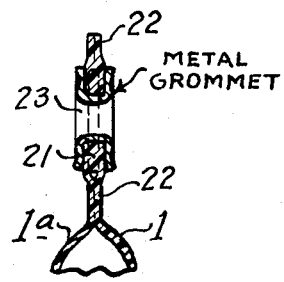
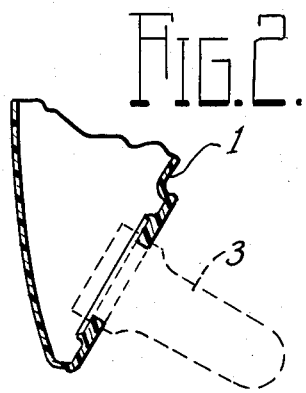
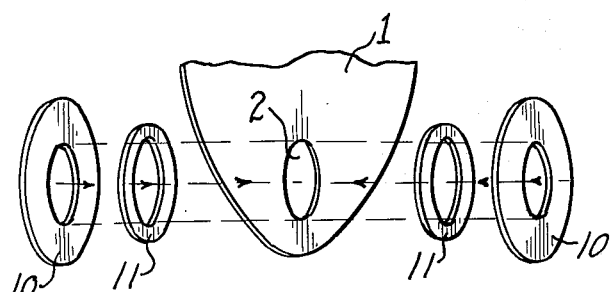
INVENTOR.
Ralph L. Kuss
BY Owen & Owen,
ATTORNEYS May 29, 1956 R. L. KUSS 2,748,047
REINFORCED WALLS OF HOLES IN PLASTIC
MEMBERS AND METHOD OF MAKING SAME
Filed Sept. 29, 1954 2 Sheets-Sheet 2
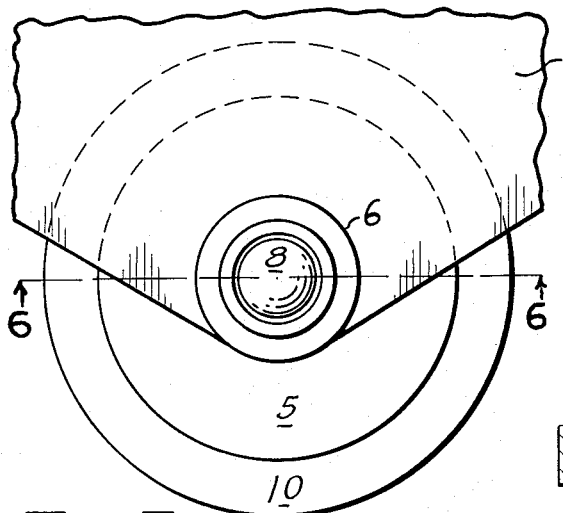
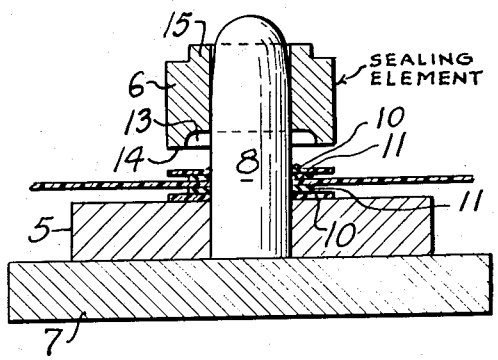
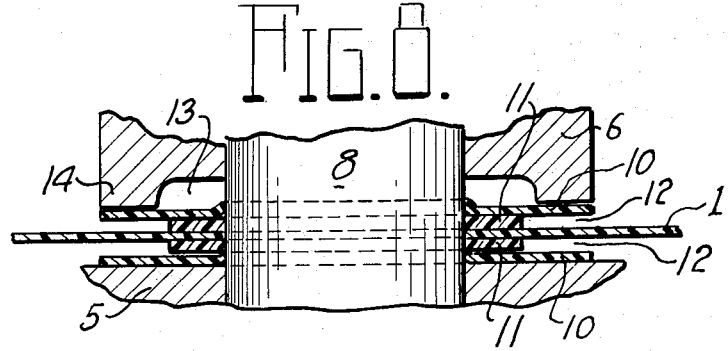
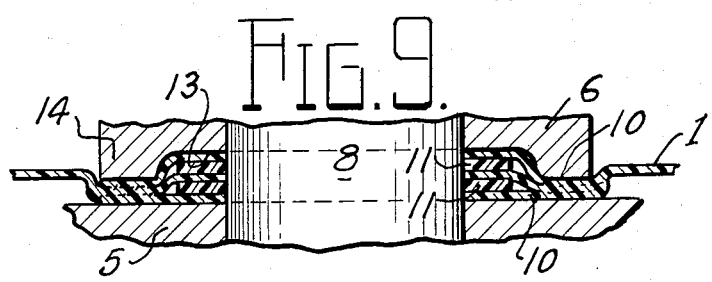
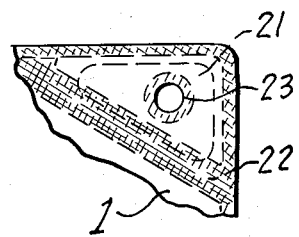
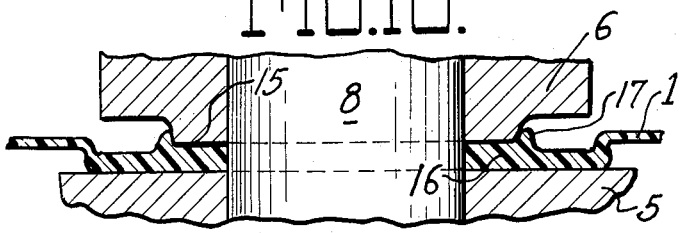
INVENTOR.
Ralph L. Kuss
BY Owen & Owen
ATTORNEYS

United States Patent Office 2,748,047
Patented May 29, 1956

2,748,047

REINFORCED WALLS OF HOLES IN PLASTIC MEMBERS AND METHOD OF MAKING SAME

Ralph L. Kuss, Findlay, Ohio

Application September 29, 1954, Serial No. 459,103

11 Claims. (Cl. 154—116)

This invention relates to reinforcing means for holes in plastic sheets used in various articles as, for instance, in bags made of vinyl material and used for carrying liquids, and a method of making same.

An object of the invention is the provision of a novel integral reinforced wall for holes in plastic sheet material such, for instance, as plasticised vinyl, whereby such walls are rendered strong and stiff to resist tearing and are suitable for receiving and firmly holding grommets or other articles.

Another object of the invention is the provision of a simple, efficient and inexpensive method for producing a reinforcement such as above-described.

The invention is fully described in the following specification, and illustrated in the accompanying drawings, in which—

Fig. 1 is an elevation of a bag or container made of plasticised material such as vinyl, and having reinforced grommet-receiving holes at the top to be engaged by suspending cords and a similar hole at the bottom for receiving and holding a liquid discharge teat;

Fig. 2 is an enlarged fragmentary section on the line 2—2 in Fig. 1;

Fig. 3 is a similar section on the line 3—3 in Fig. 1;

Fig. 4 is a plan of the reinforcing insert for the hanger hole of the bag;

Fig. 5 is a view in perspective of the parts in separated relation and which cooperate to form the lower reinforced hole in Fig. 1;

Fig. 6 is a sectional view of the cooperating reinforcing elements in assembled relation to be sealed and mounted on a mandrel between two dies preparatory to the initial sealing operation;

Fig. 7 is a top plan view of Fig. 6 with the plastic sheet forming a side of the bag broken away;

Fig. 8 is an enlarged fragmentary view of the parts shown in Fig. 6 with the top sealing element lowered in contact with the work parts preparatory to applying the work-sealing condition thereto;

Figs. 9 and 10 are views similar to Fig. 8 illustrating successive steps in the process, and Fig. 11 is a fragmentary view of an upper corner portion of the bag shown in Fig. 1, with the hole reinforcement in sealed position.

Referring first to the method employed for providing a reinforced hole in one sheet of plastic material as, for instance, in one wall of a bag of vinyl material, as illustrated in Figs. 1, 2 and 5 to 10, inclusive, 1 indicates a sheet of such material and 2 a hole therein reinforced by my method and intended, in the present instance, to receive and hold a discharge nozzle 3 shown in dotted lines in Fig. 2. In the case of an animal nursing bag, this nozzle may be a teat having at its inner end an annular groove into which the stiff reinforced edge wall of the hole may fit to firmly hold it in position.

In practicing the method, opposed pressure plates or dies 5 and 6 are employed, the plate 5 being of metal and preferably having a flat top surface and being mounted, in the present instance, on a base plate 7 from which a work-receiving mandrel 8 of electrical non-conductive material rises through a conforming hole in the plate 5. The pressure plate 6 also has a center hole for fitting over the mandrel and which cooperates therewith to guide the pressure movements of the plate in opposition to the lower plate 5. The plate 6 is reversible on the mandrel and has differently formed die or work-pressing surfaces on its opposed ends, as hereinafter described. The two pressure plates are of suitable electrical conductive material with one, preferably the lower, forming the negative electrode, and the other the positive electrode in a high frequency circuit so that a current flowing therebetween will heat the interposed work. If desired, a softening heat for the material may be received from heated dies.

In providing a strong reinforcement for the hole 2 in a sheet 1, a thin washer-like member 10 of flexible plastic material, such for instance as vinyl, is first placed over the mandrel 8 down against the pressure plate 5, the plate 6 having been first removed. The opening of this member is preferably of slightly less diameter than the mandrel so that as the member is pressed down over the mandrel its inner edge is turned up slightly around the mandrel, as indicated in Fig. 8, thus providing more material at that point for sealing purposes, as hereinafter described.

Over the member 10 on the mandrel is next placed a washer or ring-like member 11 of stiff non-elastic plastic material which may be non-plasticised vinyl of different thermal characteristic from that of the sheet 1 and member 10 so as to melt at a lower temperature. The member 11 is of less outside diameter than the member 10, approximately one-half in the present instance, is of preferably greater thickness than the member 10, as indicated, but may be of the same or less thickness, and preferably fits loosely over the mandrel. It is quite rigid or stiff so as to provide a strong rigid reinforcement for the hole wall. The members 10 may be considered as covering members for the reinforcing members 11.

The members 10 and 11 having been positioned as described, the plastic sheet 1 is placed down against the member 11 with its hole 2 around the mandrel 8 and another member 11 and member 10 are then placed in this order over the mandrel with the former bearing against the sheet 1 so that the top pair of members bear the same relation to the top surface of the sheet as the lower pair does to the lower surface. This relationship of members to the main sheet 1 provides what may be termed a sealing space 12 between each member 10 and the sheet 1 around the outer edge of the respective member 11.

The top pressure plate 6 has at one end a recess 13 immediately around its mandrel receiving opening of a diameter slightly larger than the outside diameters of the members 11 and forming, in surrounding relation to the members 11, a pressure foot 14 which is intended to engage the top or adjacent member 10 outwardly from the members 11, as shown in Fig. 8. In effecting the initial sealing operation, the plate 6 is placed down over the mandrel 8 above the assembled plastic parts and pressure is applied to cause the foot 14 to force the overhanging portion of the top member 10 down against the sheet 1 and the sheet down against the lower member 10. At the same time the heat of the plates 5 and 6 causes a softening and sealing together of the coacting portions of said outer members and sheet around the members 11, as shown in Fig. 9. This seal confines the material of the members 11 which, during the next and final pressure and heating operation, softens and flows under a lower temperature than required to soften and integrally unite the members 10 to the material of the sheet 1. The recess 13 is of sufficient depth that during the initial sealing operation little, if any, pressure is applied in the axial area of the members 11 other than to soften and flatten the up-turned inner edges of the member 10 to serve as seals around the inner edges of the member 11.

The initial sealing operation having been completed, the pressure die 6 is reversed end-for-end to cause the axially projecting pressure ridge 15 at the end of the die opposed to the recess 13 to bear against the top member 10 in the axial area of the members 11. The pressure of the opposed plates combined with the induced heat of the electrical field therebetween in the plastic material causes a softening and spreading out of the material of the members 11 between the flexible members 10 and then a softening and joining of the members and sheet 1 into an integral reinforcing mass, as noted at 16 in Fig. 10. The portion of this mass in the area of the material of the members 11 is stiff, strong and substantially non-yielding against both radial and axial pressures, while the portion without said members is of considerably greater flexibility and forms a yielding marginal edge portion from which the sheet 1 extends.

The width of the recess 13 is slightly greater than that of the projecting portion 15 at the opposite end of the plate 6 so that when the final pressure operation is completed the reinforcement of the marginal wall of the sheet hole 2 is left on its top substantially midway between its inner and outer edges with a surrounding ridge 17 which serves to further stiffen and strengthen the reinforcement. In the case of a bag, this ridge is preferably disposed at the inner side of the sheet 1.

In the forming of reinforced eyelets at the top of a bag of plastic material to which eyelet suspending hangers 20 may be attached, a stiff reinforcing plastic insert piece 21, shown in the present instance in Fig. 4 as being substantially triangular in shape, is inserted between the front and back plastic sheets 1 and 1ª of a bag at the upper corners thereof and these are provided with registering holes through which a mandrel similar to but of smaller diameter than the mandrel 8 may be projected. The plastic material may be vinyl, which is largely used for the purpose, with the insert piece 21 of a much stiffer and firmer nature than the sheets 1, 1ª, and adapted to melt at a lower temperature than the sheet material. Pressure and heat, preferably electrically induced heat, are applied to the assembled materials to cause the sheets 1 and 1ª to first be sealed together in immediate surrounding relation to the insert 21, as indicated at 22 in Figs. 3 and 11. Pressure and heat are then applied in the area of the insert to soften and flow its material into all portions of the pocket formed by the sealing action of a pressure part 22 and to integrally unite the material of the insert and sheets. After forming the reinforcement a grommet 23 may be secured in the formed hole.

Heretofore, so far as I am aware, in order to give sufficient strength at the point of suspension or attaching of a bail or the like to bags of vinyl or other similar plastic material, it has been necessary to reinforce at least one side wall of the bag with a fabric material. By the use of the present method of hole reinforcement, the use of the fabric sheet is obviated, thus saving in material expense and improving the appearance of the bag.

In both applications of the disclosed methods, a stiff or substantially rigid plastic reinforcing insert is interposed between two sheets or members of plastic material of an easily pliant nature and with the material of the insert melting under a lower temperature than the other members. Also, in both applications this difference in melting temperature is taken care of and the insert material prevented from flowing away by effecting a sealing or trapping of the insert material within a confined area between the other two members before the final pressing step of the operation takes place.

It is apparent from the foregoing that the reinforced hole wall comprises broadly a sheet of plastic material in which the hole is provided, together with a stiff plastic ring placed against the sheet closely around the hole and a flexible plastic sheet-covering for said ring and marginally overhanging or extending beyond its outer edge with the ring material melting at a lower temperature than said sheet and covering, and with the plastic sheet, the ring and the covering integrally sealed together.

What I claim is:

1. The method of reinforcing the walls of registering holes in two opposed members of flexible plastic material, which consists in interposing between said members in close surrounding relation to the holes a stiff and strong plastic insert having a melting temperature less than that of said members, applying heat and pressure to the members in the marginal outer edge portions thereof which extend beyond said insert to effect a seal therearound, then applying heat and pressure to the members and insert in the area of the latter to soften and flow the insert material within said seal and to integrally unite the materials of the members and insert.

2. The method of reinforcing the walls of registering holes in two opposed members of thin flexible plastic material, which consists in interposing an insert between said members in close surrounding relation to the holes therein, said insert being of plastic material of a stiffer and more rigid nature than said members and having a thermally different characteristic from the members whereby the insert melts at a lower temperature than the members, applying heat and pressure to said members in the marginal outer edge portions thereof which extend beyond said insert to provide a seal around the insert, then applying heat and pressure to the members and insert around the holes in the area of the insert to soften the members and insert and axially compress and integrally unite them.

3. The method of reinforcing the walls of registering holes in two opposed members of thin flexible vinyl material, which consists in interposing an insert between said members in close surrounding relation to the holes therein, said insert being of plastic vinyl material of a stiffer and more rigid nature than said members and having a thermally different characteristic from the members whereby the insert melts at a lower temperature than the members, applying heat and pressure to said members in the marginal outer edge portions thereof which extend beyond said insert to provide a seal therearound, then applying heat and pressure to the members and insert around the holes in the area of the insert to soften the members and insert and axially compress and integrally unite them.

4. The method of reinforcing the wall of a hole in a thin flexible plastic sheet material, which consists in placing around said hole in substantially close relation thereto and against its marginal wall portion a stiff plastic insert of a substantially rigid nature and which melts under a lower temperature than said thin plastic material, placing over said insert in immediate surrounding relation to said hole and in outward overlapping relation to the insert a thin plastic member which has a higher melting temperature characteristic than the insert, and first applying pressure and heat to the assembled parts at the marginal outer edge portions of the member which extend beyond the insert to seal the overlapping portion of said member to said plastic sheet material in surrounding relation to the insert, then applying heat and pressure to the parts in the area of the insert to compress and integrally unite the parts.

5. The method of reinforcing the wall of a hole in a sheet of plastic material capable of softening under heat, which comprises placing around said hole at one side of the sheet a stiff non-elastic ring-like member of plastic material which melts at a lower temperature than said sheet material, placing over said first member a second member of flexible plastic material which melts at substantially the same temperature as said sheet and which overlaps the first member at its outer edge, applying heat and pressure to the sheet and second member in the marginal outer edge portion of said second member which extends beyond said first member to provide a seal around the latter, and then applying heat and pressure to the sheet and two members within said seal to integrally unite the sheet and members.

6. The method as called for in claim 5, wherein said sheet and members are of vinyl material with the first member of a more rigid nature than the sheet and other member.

7. The method of reinforcing the wall of a hole in a sheet of flexible plastic material capable of softening under heat, which comprises placing a stiff non-elastic reinforcing plastic member around the hole against the marginal wall thereof at each side of the sheet, covering each reinforcing member at its outer side with an easily flexible plastic member which overhangs the outer edge of the member which it covers, said reinforcing member being of plastic material which melts at a lower temperature than said sheet and the covering members, applying heat and pressure to the sheet and marginal outer edge portion of the covering members which extend beyond said reinforcing member to integrally unite the sheet and said second member and form a seal therebetween around the reinforcing members, and then applying pressure and heat in the area of the reinforcing members to integrally unite them to the sheet and respective covering members.

8. The method as called for in claim 7, wherein the sheet and covering members are of plasticised vinyl material and the reinforcing member is of non-platicised vinyl material.

9. A reinforcement for the wall of a hole in a sheet of plastic material, comprising a plastic reinforcing member around the hole with the plastic of the member stiff and non-elastic and being of a nature to melt at a lower temperature than the sheet material, and a covering member for the reinforcing member of a material similar to that of the sheet and overlapping the reinforcing member at its outer edge entirely around the same, the sheet, the reinforcing member and the covering member being integrally sealed together with the sealing occurring in the marginal outer edge portions of the covering member which extend beyond the reinforcing member.

10. A reinforcement for the wall of a hole in a sheet of plastic material, comprising a plastic reinforcing member around the hole at each side of the sheet with these members stiff and non-elastic and being of a nature to melt at a lower temperature than the sheet material, and a covering member over the outer side of each reinforcing member being of a material similar to that of the sheet and overlapping the reinforcing members at their outer edges, the sheet reinforcing members and covering members being integrally sealed together with the sealing occurring in the marginal outer edge portions of the covernig member which extend beyond the reinforcing member.

11. A combination as called for in claim 10, wherein the sheet and covering members are of plasticised vinyl and the reinforcing members are of non-plasticised vinyl.

References Cited in the file of this patent

UNITED STATES PATENTS

| 1,122,280 | Kempshall | Dec. 29, 1914 |
| 2,366,274 | Luth et al. | Jan. 2, 1945 |

FOREIGN PATENTS

| 629,474 | Great Britain | Sept. 21, 1949 |